(12) United States Patent
Heinrich et al.

(10) Patent No.: US 10,337,629 B2
(45) Date of Patent: Jul. 2, 2019

(54) CHECK VALVE

(71) Applicant: Eagle Actuator Components GmbH & Co. KG, Weinheim (DE)

(72) Inventors: Ralf Heinrich, Schwegenheim (DE); Michael Fuchs, Mannheim (DE)

(73) Assignee: Eagle Actuator Components GmbH & Co. KG, Weinheim (DE)

( * ) Notice: Subject to any disclaimer, the term of this patent is extended or adjusted under 35 U.S.C. 154(b) by 0 days.

(21) Appl. No.: 15/890,499

(22) Filed: Feb. 7, 2018

(65) Prior Publication Data

US 2018/0224009 A1 Aug. 9, 2018

(30) Foreign Application Priority Data

Feb. 9, 2017 (DE) .......................... 10 2017 102 586

(51) Int. Cl.
*F16K 15/14* (2006.01)
(52) U.S. Cl.
CPC .................................. *F16K 15/148* (2013.01)
(58) Field of Classification Search
CPC ...... F16K 15/14; F16K 15/141; F16K 15/148; F16K 15/03; F16K 15/031; F16K 15/035; F16K 15/036; F16K 15/038
See application file for complete search history.

(56) References Cited

U.S. PATENT DOCUMENTS

| 3,312,237 A | 4/1967 | Mon | |
| 3,568,977 A * | 3/1971 | Nelson | F16K 15/148 137/512.15 |
| 4,222,407 A | 9/1980 | Ruschke | |
| 4,556,086 A * | 12/1985 | Raines | F16K 15/141 137/843 |
| 4,827,973 A * | 5/1989 | Boehmer | A61M 39/24 137/512.15 |
| 4,898,581 A * | 2/1990 | Iwatschenko | A61M 5/36 137/854 |
| 5,725,374 A * | 3/1998 | Young | A61C 1/18 433/95 |

FOREIGN PATENT DOCUMENTS

| CH | 585363 A5 | 2/1977 | |
| DE | 2920242 A1 | 3/1980 | |
| DE | 4439880 C2 | 5/1996 | |
| DE | 69408765 T2 | 10/1998 | |
| DE | 102012209653 A1 * | 12/2013 | ........... F16K 15/148 |
| DE | 102012221695 A1 * | 5/2014 | ........... F16K 15/148 |
| DE | 102014002142 A1 | 8/2015 | |
| WO | WO2005061934 A1 | 7/2005 | |

OTHER PUBLICATIONS

English Translation of DE4439880, Willi Kronnpf et al.,May 15, 1996 (Year: 2019).*

* cited by examiner

*Primary Examiner* — Reinaldo Sanchez-Medina
*Assistant Examiner* — Hailey K. Do
(74) *Attorney, Agent, or Firm* — Katterle Nupp LLC; Paul Katterle; Robert Nupp (57) ABSTRACT

A check valve with a a housing having an inlet connected to an outlet. A stop and a membrane are disposed in the housing. The membrane is movable and bendable to control fluid flow between the inlet and the outlet. The stop may be an elongated extension about which the membrane may bend along a line or a curve such that the extension lies between overlapping sections of the membrane.

15 Claims, 7 Drawing Sheets

CHECK VALVE

CROSS-REFERENCE TO RELATED APPLICATION(S)

This application claims priority under 35 U.S.C. § 119 to: German Patent Application No.: 10 2017 102 586.3, filed on Feb. 9, 2017, which is herein incorporated by reference.

TECHNICAL FIELD

The present disclosure relates to a check valve having a deformable membrane.

BACKGROUND

From DE 44 39 880 C2, a check valve with a housing is already known, in which a pin-shaped stop for a membrane is formed. Specifically, the stop is essentially designed so as to be frusto-conical. The cross-section surface of the stop expands in flow direction.

The membrane is usually made of an elastomer material and deformable. In the check valve according to DE 44 39 880 C2, the membrane is initially movable in its entirety and after traversing a short travel distance, it is pressed against the stop surface of a crest or tip of the frusto-conical stop. Due to the stop surface, a great surface pressure acts on a relatively small surface of the membrane.

This surface pressure can significantly lead to a stretching of the membrane. As a result, the material of the membrane is greatly worn and can even result in cracks if the membrane is highly stressed.

Therefore, the present disclosure addresses the problem of providing a check valve with a deformable or bendable membrane which shows as few signs of wear as possible after an extended operating time of the check valve.

SUMMARY

In accordance with the disclosure, a check valve is provided, having an inlet connected to an outlet. A stop and a membrane are disposed in the housing. The membrane is movable and bendable to control fluid flow between the inlet and the outlet. The membrane is movable into contact with the stop. The stop includes an elongated extension about which the membrane may bend along a line or a curve such that the extension lies between overlapping sections of the membrane.

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

According to the disclosure, the stop is designed as elongated extension, around which the membrane is bendable at least in sections along a bending line or bending curve such that the extension lies between two overlap sections of the membrane. According to the invention, an elongated structure is used as a stop. The structure effects a defined deformation of the membrane because said membrane effectively folds over the structure along the bending line or bending curve of the membrane. The structure provides the membrane essentially with a finitely thin bending edge, namely a suitably narrow planar or curved strip as stop surface or contact surface. As a result, the membrane is surprisingly subject to reduced wear. Of course, the thickness of the bending edge or the strip is selected such that the membrane is not damaged, when the membrane bears against or makes contact with the extension and is subsequently effectively folded or bent.

At least in sections, the extension could have a straight or curved strip as stop surface which faces the membrane. A narrow strip provides an almost linear stop. The stop can be curved or inclined both in the direction of movement of the membrane and orthogonally to this direction. It is essential that the strip, whether continuous or non-continuous, serves as a bending edge or line stop, around which the membrane can, at least in sections, fold or bend.

Against this backdrop, the extension could have an elongated profile, on which the stop surface is formed. A profile can easily be glued or placed onto an already present main element of the extension. The profile can be made of a material which is soft enough to not damage the membrane when it contacts the profile. The profile is preferably made of an elastomer.

The extension could have an elongated strut which is arranged in or is integral with the housing. As a result, the manufacture of the check valve is simplified. The strut can be injection-molded with the remainder of the housing. A profile can easily be placed or glued onto a strut.

The strut could form a partition within the housing, creating at least in sections two flow sections in a flow channel. As a result, the flow characteristics within the check valve are improved.

The membrane could have a disc base, from which a spike protrudes which is movable and/or received in a guide of the housing, wherein the disc base has two overlap sections which are bendable around the extension. The spike ensures that the membrane is movable to a sealing position or is held in same, when the check valve is closed and the inlet and the outlet are separated from one another in a fluid-conducting manner. A tilting of the membrane is prevented. The overlap sections ensure that the check valve can easily be switched to an open state, namely when the inlet and the outlet are connected to one another in a fluid-conducting manner. The overlap sections are preferably formed by a predetermined bending point in the disc base in order to ensure that the membrane can be folded or bent particularly quickly and easily around the extension.

The extension could have a length that corresponds to at least half of the diameter of the undeformed membrane, or have a length that is greater than the diameter of the undeformed membrane. As a result, the membrane is effectively supported and protected by the extension. In addition, a sufficiently long bending line or bending curve is formed in the membrane, when the membrane is bent around the extension.

The elongated extension can be associated with or formed in only one housing part, wherein the housing consists of at least two housing parts. The manufacture of the check valve is thus simplified.

Against this backdrop, the check valve could have a three-part structure, wherein the housing is made of only two housing parts, and wherein the membrane is received as the only third part between the housing parts. As a result, the manufacture is particularly simple and storage is greatly simplified.

The membrane could be made of an elastomer and/or have a predetermined bending point or predetermined bending line. As a result, the membrane is particularly easily reversibly bendable or foldable.

Figure 1:
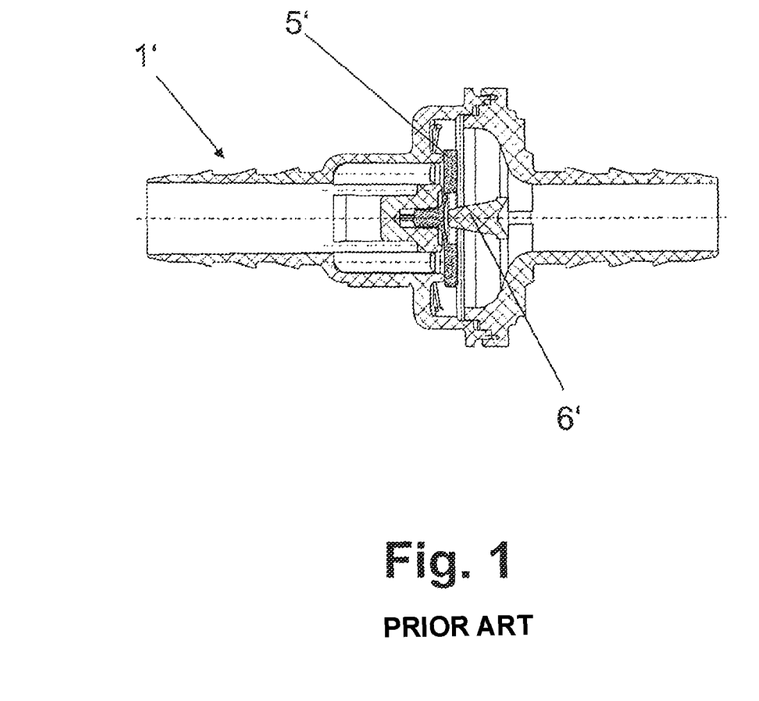
FIG. 1 shows a check valve according to the prior art with a frusto-conical stop for supporting the membrane, wherein the check valve is closed.
Figure 2:
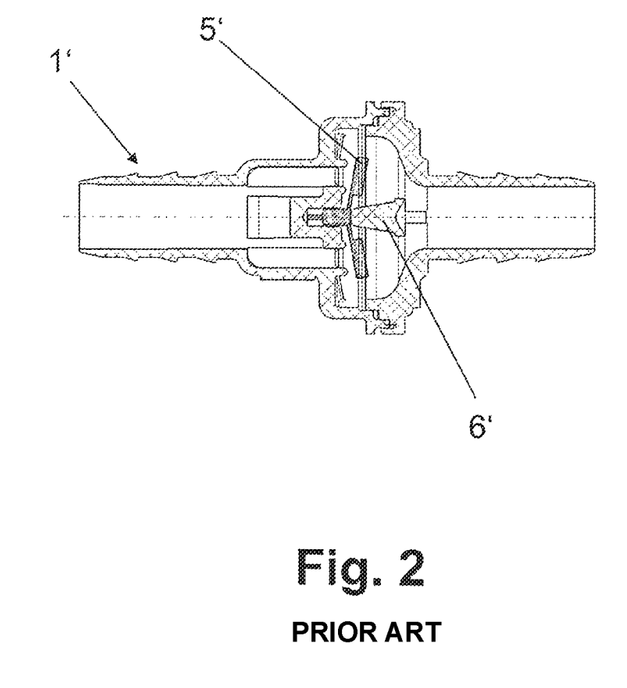
FIG. 2 shows the check valve according to FIG. 1, wherein the check valve is open and the membrane is deformed.
Figure 3:
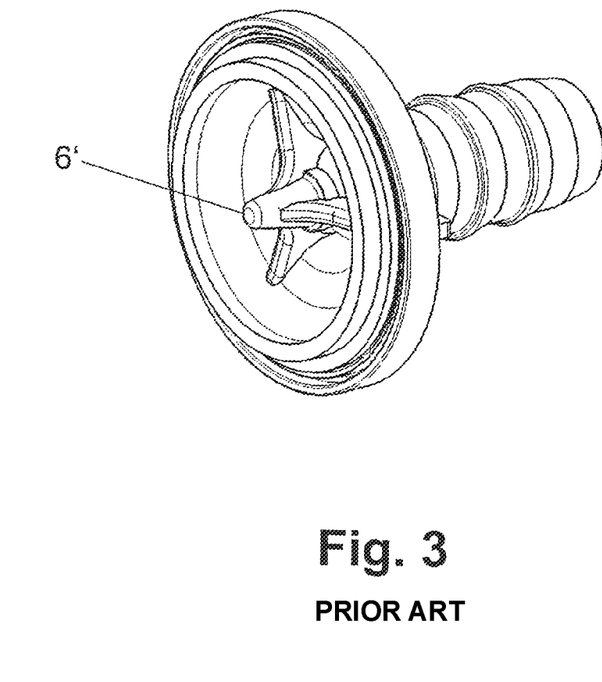
FIG. 3 shows a perspective view of a housing part according to the prior art, in which a frusto-conical stop for supporting the membrane is formed.

FIG. 1 shows a check valve 1' according to the prior art with a frusto-conical stop 6' for supporting the membrane 5', wherein the check valve 1' is closed. FIG. 2 shows the check valve 1' according to FIG. 1, wherein the check valve 1' is open and the membrane 5' is deformed. FIG. 3 shows a perspective view of a housing part according to the prior art, in which a frusto-conical stop 6' for supporting the membrane 5' according to FIGS. 1 and 2 is formed.

Figure 4:
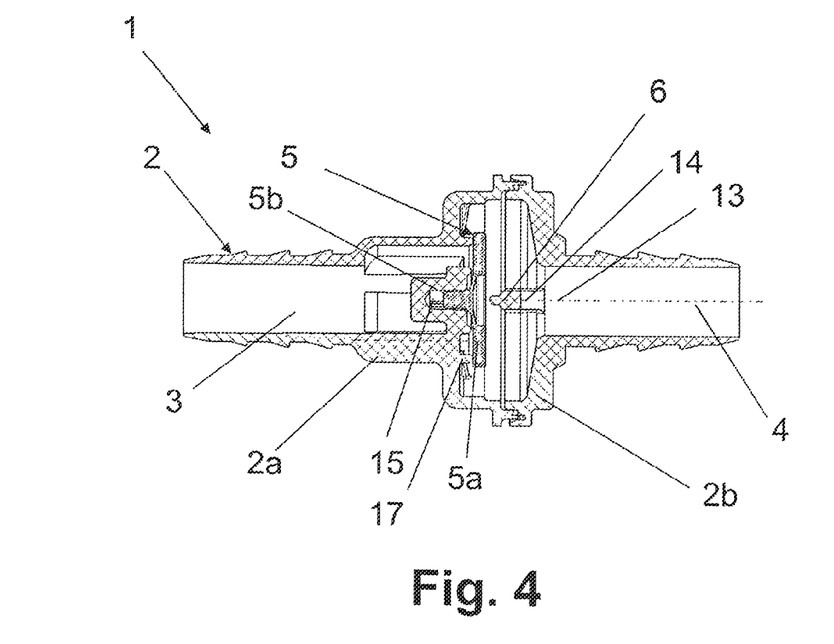
FIG. 4 shows a check valve with a stop which is formed as an elongated extension for supporting the membrane, wherein the check valve is closed and a fluid flow from the outlet in the direction of the inlet is prevented.

FIG. 4 shows a check valve 1, comprising a housing 2 with an inlet 3, an outlet 4, and a membrane 5. The inlet 3 and the outlet 4 are connectable to one another in a fluid-conducting manner or severable by means of the membrane 5 which at least in sections is movable and/or in sections deformable. At least in sections, the membrane 5 can make contact with a stop. By shifting and deforming the deformable membrane 5, the inlet 3 and the outlet 4 are connected to one another in a fluid-conducting manner. FIG. 4 shows the check valve in a closed state, wherein the membrane 5 bears against the sealing seat 17. The stop is designed as an elongated extension 6.

Figure 5:
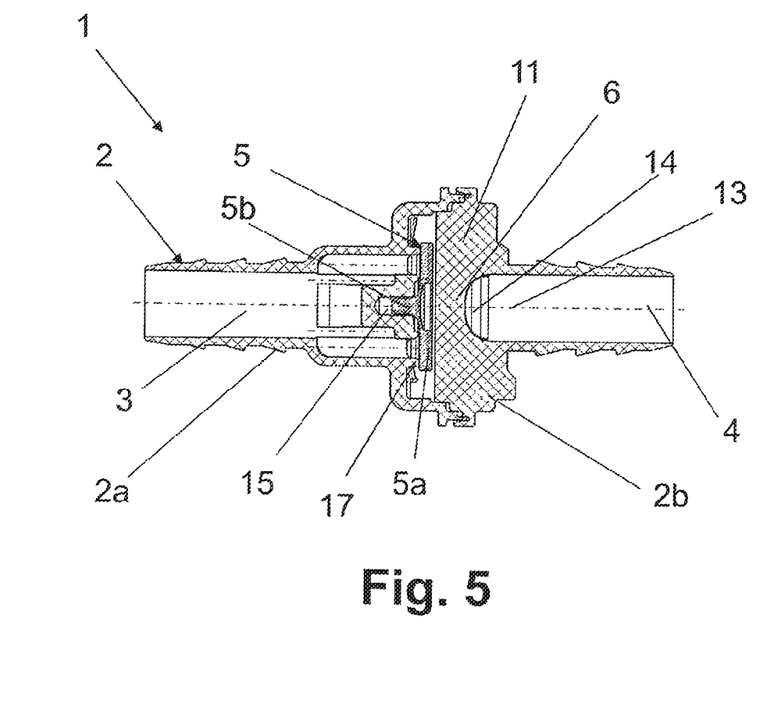
FIG. 5 shows the closed check valve according to FIG. 4 in a cutaway view which, with regard to FIG. 4, is rotated by 90°, wherein it is shown that the extension serves as a partition.

FIG. 5 shows the closed check valve 1 in a cutaway view which, with regard to the cutaway view of FIG. 4, is rotated by 90°.

In the closed state of the check valve 1, there can be no fluid flow coming from the outlet 4 to the inlet 3. In this blocking direction, no fluid flow is possible. If the pressure ratios change, the membrane 5 is shifted and deformed and the check valve 1 is opened, and so a fluid flow coming from the inlet 3 in the direction of the outlet 4, namely in passage direction, is possible. The membrane 5 can be shifted in its entirety, before it is deformed. A slight fluid flow is already made possible during the shifting, i.e., prior to deformation.

Figure 6:
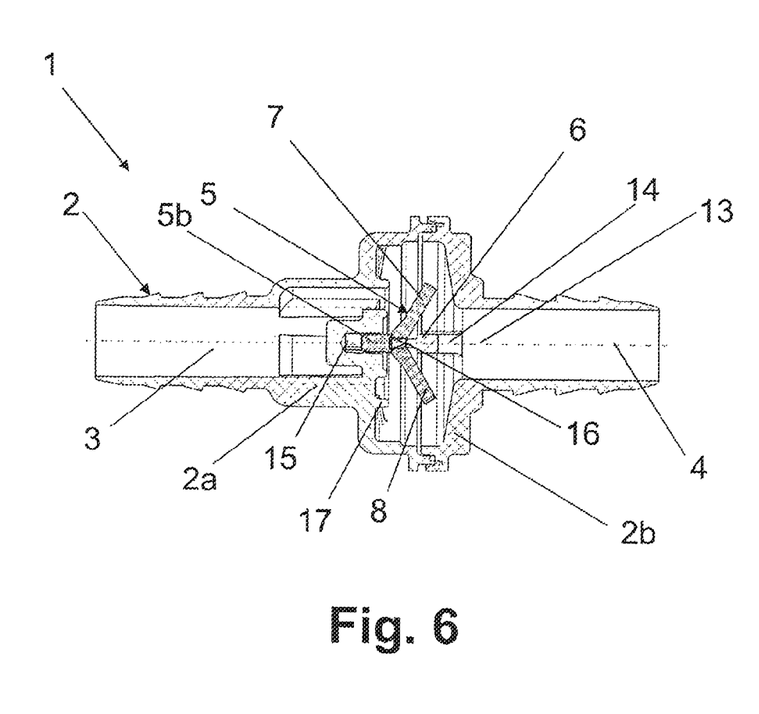
FIG. 6 shows the check valve according to FIG. 4, wherein the check valve is open and the membrane is bent along a bending line, wherein a fluid flow from the inlet in the direction of the outlet is made possible.

FIG. 6 shows effectively that the stop is designed as an elongated extension 6, around which the membrane 5 is bendable along a bending line 16, and that the extension 6 lies between only two overlap sections 7, 8 of the membrane 5.

Figure 7:
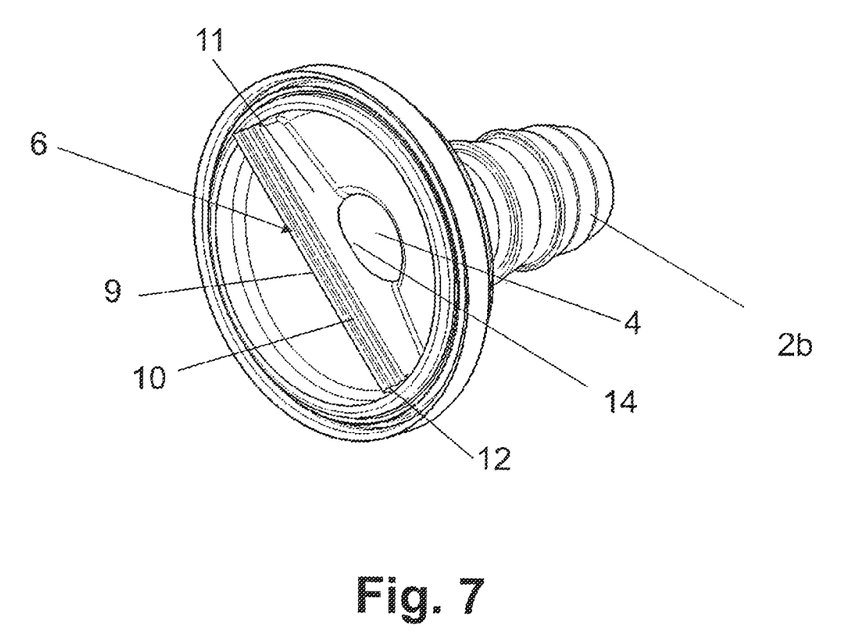
FIG. 7 shows a perspective view of a housing part, in which an elongated straight extension is formed.

FIG. 7 shows that the extension 6 has as a stop surface at least to some extent a straight strip 9 which faces the membrane 5. The strip 9 extends in a straight line and transversely through the interior of the housing part 2b. Insofar, the extension 6 extends overall in a straight line and transversely over the entire inner diameter of the housing part 2b.

The extension 6 has an elongated profile 10, on which the stop surface, namely the strip 9 is formed. The strip 9 is curved in the direction of movement of the membrane 5. The profile 10 has a profile cross-section surface 12 which is indicated by the curvature of the strip 9. The strip 9 functions as a bending edge for the membrane 5.

The extension 6 has an elongated strut 11 which is arranged in or is integral with the housing 2. The strut 11 forms a partition within the housing 2 and creates in a flow channel 13 at least in sections two flow sections. The flow sections come together in the area of an arch-shaped recess 14 in the strut 11.

The membrane 5 has a disc base 5a, from which a spike 5b protrudes which is received in a guide 15 of the housing 2, namely a housing part 2a. The disc base 5a has the two overlap sections 7, 8 which are bendable around the extension 6.

FIG. 5 shows particularly clearly that the extension 6 has a length which is greater than the diameter of the undeformed membrane 5, namely, it is greater than the diameter of the disc base 5a of the undeformed membrane 5.

FIGS. 5 and 7 show particularly clearly that the elongated extension 6 is associated with and formed in a housing part 2b, wherein the housing 2 consists of at least two housing parts 2a, 2b.

The check valve 1 has a three-part structure, wherein the housing 2 is made of only two housing parts 2a, 2b, and wherein the membrane 5 is received as the third part between the housing parts 2a, 2b. The membrane 5 is made of an elastomer.

Due to the use of the elongated extension 6, no insular planar crest or tip is used as stop surface which, for example, has a circular, elliptical, or oval border. Instead, a straight stop surface, which extends preferably linearly in one direction, or an idealized stop surface is used, which is associated with the membrane 5 as a bending line or provides the membrane 5 with a bending line.

The inlet 3 and the outlet 4 are arranged collinearly, wherein the membrane 5 is positioned between them. Both the inlet 3 and the outlet 4 are designed as a profile connector, to which lines with or without hose clamps can be connected. The profile connectors are also arranged collinearly, wherein a housing chamber is arranged between the profile connectors, in which the membrane 5 and the extension 6 are received.

The check valve 1 is preferably used in a motor vehicle, particularly in its tank compartment or motor compartment.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A check valve comprising:
   a housing having an inlet connected to an outlet and including an interior guide;
   a stop disposed in the housing;
   a membrane disposed in the housing and being movable and bendable to control fluid flow between the inlet and the outlet, the membrane being movable into contact with the stop and comprising a disc base having a spike protruding therefrom, the spike being movably received within the interior guide of the housing;

wherein the stop comprises an elongated extension about which the disc base of the membrane may bend along a line or a curve such that the extension lies between overlapping sections of the disc base, and wherein the extension has a length in a direction normal to the direction of fluid flow between the inlet and the outlet, the length of the extension being at least half of the diameter of the undeformed membrane; and wherein the extension includes a strip joined to a strut, the strip facing the membrane and having a thickness less than the strut.

2. The check valve according to claim 1, wherein the membrane comprises a disc base, and wherein the extension has a length that is greater than the diameter of the disc base of the undeformed membrane.

3. The check valve according to claim 1, wherein the membrane has a predetermined bending point or predetermined bending line.

4. The check valve according to claim 1, wherein the strip is rounded.

5. The check valve according to claim 4, wherein the extension has an elongated profile on which the strip is formed.

6. The check valve according to claim 1, wherein the strut is integral with the housing.

7. The check valve according to claim 6, wherein the housing defines an inner flow channel and wherein the strut forms a partition within the housing that divides a portion of the inner flow channel into two flow sections.

8. The check valve according to claim 1, wherein the housing comprises first and second housing sections, and wherein the stop is part of the second housing section.

9. The check valve according to claim 8, wherein the check valve has a three-part structure, wherein the housing consists of the first and second housing sections, and wherein the membrane is received as a third part between the first and second housing sections.

10. The check valve according to claim 1, wherein the membrane is made of an elastomer.

11. The check valve according to claim 10, wherein the membrane has a predetermined bending point or predetermined bending line.

12. The check valve according to claim 1, wherein in response to a change in pressure ratio between the inlet and the outlet, the membrane is movable between an open position, wherein fluid may flow between the inlet and the outlet, and a closed position, wherein fluid may not flow between the inlet and the outlet.

13. The check valve according to claim 12, wherein the housing comprises a first section having a seat and a second section that includes the extension, and wherein when the membrane is in the open position, the membrane is disposed against the extension and is bent such that the extension is disposed between the overlapping sections of the membrane.

14. The check valve according to claim 13, wherein when the membrane is in the open position, the membrane is not pressed against the seat.

15. The check valve according to claim 13, wherein when the membrane is in the closed position, the membrane is pressed against the seat.

* * * * *